May 2, 1939.  O. T. HANDWERK  2,156,496

SENSITIVE INSTRUMENT

Filed Sept. 4, 1937

Inventor
Otto T. Handwerk
By McConkey Dawson & Booth
Attorneys

Patented May 2, 1939

2,156,496

UNITED STATES PATENT OFFICE 2,156,496

SENSITIVE INSTRUMENT

Otto T. Handwerk, Chicago, Ill., assignor to Republic Flow Meters Company, Chicago, Ill., a corporation of Illinois Application September 4, 1937, Serial No. 162,502

8 Claims. (Cl. 267—1)

This invention relates to sensitive instruments and more particularly to instruments for measuring or controlling a condition in which a force varying with the condition is balanced against a spring.

One of the objects of the invention is to provide a sensitive instrument including a sensitive element opposed by a laterally flexible spring in which the point of engagement of the element with the spring is constant.

Another object of the invention is to provide a novel resilient element for use in a sensitive instrument including a leaf spring which is so mounted that its point of engagement with an instrument part remains constant.

Still another object of the invention is to provide a mounting for a leaf spring or the like such that the projected distance between the mounting axis and the free end of the spring is constant.

Other objects, advantages and novel features of the invention will be apparent from the following description when read in connection with the accompanying drawing, in which.

The invention is applicable to various types of measuring and controlling instruments, as for example regulators of the type shown in the copending application of Spitzglass and Handwerk Serial No. 175,448 filed November 19, 1937. In instruments of this type wherein a force proportional to a function of the condition being measured or regulated is balanced against a spring, it is desirable to employ a leaf spring. However, when a leaf spring is flexed the effective or projected distance between its ends varies, thereby causing a relative movement between the spring and the instrument part which it engages. The present invention overcomes this difficulty and makes it practical to employ leaf springs in various types of sensitive instruments.

Figure 2:
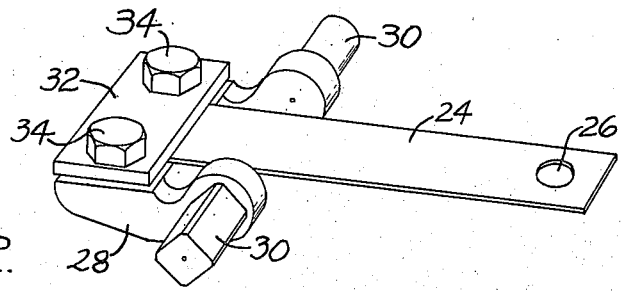
Figure 2 is a perspective of the spring and spring mounting of Figure 1.
Figure 1:
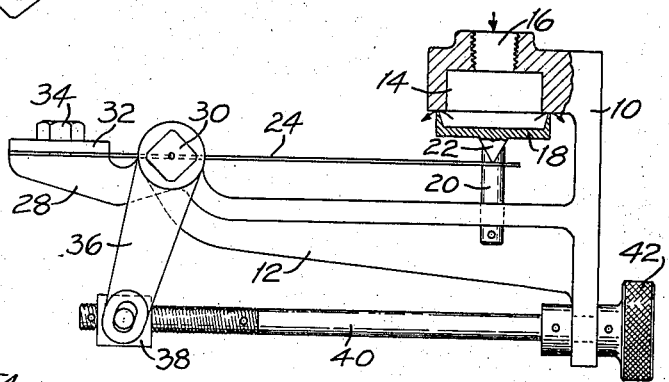
Figure 1 is a side view with parts in section of a sensitive instrument embodying the invention.

In the embodiment of Figure 1 the instrument comprises a panel part 10 carrying a horizontal bracket 12 which is formed with a bifurcated outer end. A chamber 14 is formed in the bracket 19 having a top inlet opening 16 and an open bottom closed by a cup valve 18. The cup valve may have a stem 20 extending through an opening in the bracket 12 to guide it and is preferably formed with a pair of knife edges 22 on its lower end.

The cup valve 18 is held against the lower end of the chamber 14 by a leaf spring 24 having an opening 26 in one end to receive the stem 20 and adapted to engage the knife edges 22. The spring is carried by a novel mounting including a U-shaped yoke 28 having pintles 30 at the ends of its legs to be journaled in the ends of the bracket 12. The center portion of the yoke lies at the side of the pivotal axis remote from the valve 18 and has a plate 32 secured thereto as by screws 34 for clamping the end of the spring 24 thereto.

The pivotal position of the yoke and consequently the tension of the spring may be controlled in any desired manner to control the pressure urging valve 18 closed. For purposes of illustration a manual control has been shown including a lever 36 secured to a squared end on one of the pintles 30 and carrying at its opposite end a collar 38 which is threaded on an adjusting screw 40. The screw 40 is journaled in the panel 10 and has a knob 42 on its outer end by which it may be rotated.

Fluid under pressure is conducted into the chamber 14 through opening 16 and exerts a force on the valve 18 tending to unseat it. If this force is greater than the tension of spring 24 the valve 18 will be unseated slightly to allow escape of fluid until the pressure in chamber 14 exactly balances the spring force. Thus the pressure in chamber 14 varies with the setting of spring 24 and may be utilized to control a condition, the pressure in this case being proportional to a function of the condition.

Figure 4:
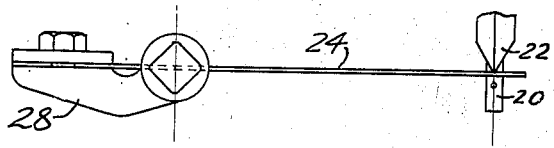
Figures 4, 5 and 6 are diagrams showing different positions of the spring and spring mounting.
Figure 5:
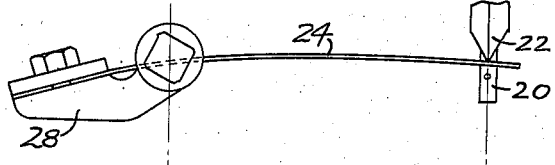
Figure 6:
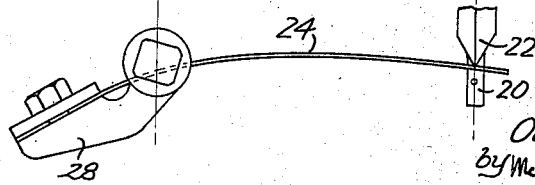

To adjust the spring 24 the rod 40 may be turned to screw the collar 38 in one direction or the other, thereby rocking the yoke 28 about its pivotal axis. Figures 4, 5 and 6 illustrate three different adjusted positions, the position of Figure 4 being the substantially zero position in which the spring is straight and passes through the pivotal axis of the yoke 28. As the yoke is turned to the position of Figure 5 or further into the position of Figure 6 the spring 24 is placed under tension and is bowed as shown. Due to its curved shape the straight line distance between its ends is shortened but at the same time the horizontal projected distance between the center of yoke 28 and the pivotal axis decreases by an equal amount. Therefore, the projected length of the spring between the pivotal axis and the knife edges 22 remains constant. This is a very important feature since it eliminates any tendency for the spring to drag across the knife edges or to tilt the valve and insures that the valve will seat squarely at all times.

Figure 3:
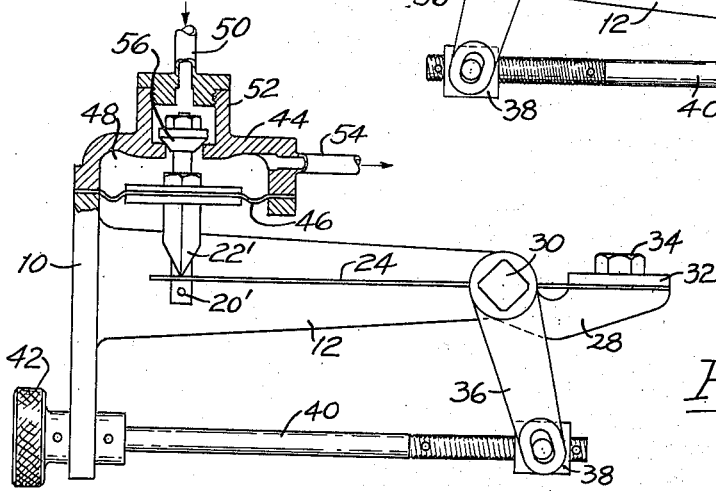
Figure 3 is a view similar to Figure 1 showing a modified construction.

Figure 3 illustrates a modified construction in which many of the parts are identical with those in Figure 1 and have been designated by the same reference numerals. In this construction the panel 10 carries at its upper end a head 44 serving to clamp a flexible diaphragm 46 which forms one side of a pressure chamber 48 in the head. A fluid pressure inlet 50 communicates with the chamber 48 past a valve seat 52 and an outlet pipe 54 leads from the chamber 48 to any desired controlling or regulating instrument.

The diaphragm 46 carries on its upper side a valve 56 cooperating with the seat 52 and on its lower side has a stem 220' adapted to extend through the hole 26 in spring 24 and a pair of knife edges 22' to engage the spring.

In the device of Figure 3 the pressure in pipe 54 which is used to control a condition is proportional to a function of the condition. This pressure is balanced against the spring force through the diaphragm 46 and is always proportional to the spring setting since valve 56 will be closed as soon as the pressure tends to overbalance the spring force and will be opened if the spring force tends to overbalance the pressure. The spring adjustment and operation is the same in this construction as in Figure 1 and will not be described in detail.

While two embodiments of the invention have been shown and described it is to be understood that the scope of the invention is not limited thereto nor otherwise than by the terms of the appended claims.

What is claimed is:

1. A sensitive instrument comprising an element exerting a force proportional to a function of a condition to be measured or controlled, a laterally flexible spring mounted at one end and engaging said element at its other end, a pivoted member having a portion lying at the side of its pivotal axis remote from the element, means securing said one end of the spring to said portion, the spring passing through an extension in space of the pivotal axis of said member, and means for controlling the position of said member about its pivotal axis.

2. A sensitive instrument comprising an element exerting a force proportional to a function of a condition to be measured or controlled, a laterally flexible spring mounted at one end and engaging said element at its other end, a U-shaped member having its legs mounted on alined pivots with its center lying on the side of the pivots remote from said element, said one end of the spring being secured to the center portion of said member, and means for controlling the position of said member about its pivots.

3. A sensitive instrument comprising an element exerting a force proportional to a function of a condition to be measured or controlled, a leaf spring engaging said element adjacent one of its ends, mounting means including a pivotally mounted member having a portion lying on the side of its pivotal axis remote from said element and substantially in alinement with its pivotal axis and the point of engagement of the spring with said element, the other end of the leaf spring being secured to said portion, and means for controlling the position of said member about its pivotal mounting.

4. A sensitive instrument comprising an element exerting a force proportional to a function of a condition to be measured or controlled, a laterally flexible spring mounted at one end and engaging said element at its other end, U-shaped yoke having its legs mounted on alined pivots with its center portion lying on the side of said pivots remote from the element, the other end of the leaf spring being secured to said center portion, and means for controlling the position of said yoke about the pivots.

5. In a sensitive instrument, a resilient element comprising an elongated laterally flexible spring adapted to engage an instrument part at one end, a U-shaped mounting member having its legs pivoted on alined axes and its center portion lying on the side of its pivotal axis remote from said part, and means to secure the other end of the spring to said center portion whereby the point of engagement of said part with the spring will remain constant.

6. In a sensitive instrument, a resilient element comprising a leaf spring adapted to engage an instrument part at one end, a U-shaped yoke having its legs pivoted on alined axes with its center portion lying on the side of said axes remote from the instrument part, the other end of said leaf spring being secured to said center part, and means to control the position of the yoke about said axes.

7. In a sensitive instrument having a leaf spring engageable at one end with an instrument part, a spring mounting device comprising a U-shaped yoke having pivotal mounting means at the ends of its legs and means at its center for mounting one end of a spring whereby the distance between the axis of said pivotal mounting means and the free end of the spring will remain substantially constant.

8. In a sensitive instrument, a resilient element comprising an elongated laterally flexible spring adapted to engage an instrument part at one end, a mounting member having pivotal mounting means and an offset portion lying on the side of its pivotal axis remote from said part, and means to secure the other end of the spring to said portion whereby the point of engagement of said part with the spring will remain constant, said spring normally passing through an extension in space of the pivotal axis of said member.

OTTO T. HANDWERK.